United States Patent [19]

Easton et al.

[11] Patent Number: 4,693,185
[45] Date of Patent: Sep. 15, 1987

[54] CONTROL SYSTEMS FOR VEHICLE FLUID SUSPENSION SYSTEMS

[75] Inventors: Trevor A. Easton, Grimsby; John A. Gaiser, Beamsville, both of Canada

[73] Assignee: Dofasco Inc., Hamilton, Canada

[21] Appl. No.: 831,678

[22] Filed: Feb. 21, 1986

[51] Int. Cl.⁴ .............................................. B61F 5/36
[52] U.S. Cl. ........................... 105/199.2; 105/199.1; 105/198.1; 105/198.3
[58] Field of Search ................ 105/164, 157, 182 R, 105/197 DH, 197 B, 199 R, 199 A; 280/714, DIG. 1; 267/64.16, DIG. 2

[56] References Cited

U.S. PATENT DOCUMENTS

| | | | |
|---|---|---|---|
| 2,161,687 | 6/1939 | Schoepf et al. | 105/199 A X |
| 2,954,238 | 9/1960 | Swander, Jr. | 105/197 B |
| 2,969,975 | 1/1961 | Chuba | 105/197 B |
| 3,573,884 | 4/1971 | Pollinger | 280/124 |
| 3,683,818 | 8/1972 | Meir et al. | 105/164 |
| 3,688,703 | 9/1972 | Pollinger | 105/453 |
| 3,688,704 | 9/1972 | Strohmer | 105/453 |
| 3,695,186 | 10/1972 | Herring, Jr. | 105/171 |
| 3,701,397 | 10/1972 | Shirane et al. | 188/33 |
| 3,738,680 | 6/1973 | Pollinger et al. | 267/64.16 X |
| 3,757,702 | 9/1973 | Kreissig et al. | 105/199 R X |
| 3,789,769 | 2/1974 | Strohmer et al. | 105/164 |
| 3,868,910 | 3/1975 | Schultz | 105/164 |
| 3,896,740 | 7/1975 | Kreissig | 105/164 |
| 3,902,691 | 9/1975 | Ott | 246/167 |
| 3,918,369 | 11/1975 | Kitaoka et al. | 105/164 |
| 3,970,009 | 7/1976 | Schultz | 105/164 |
| 4,077,617 | 3/1978 | Wright | 267/64.16 |
| 4,099,742 | 7/1978 | Wright | 280/714 |

*Primary Examiner*—Robert B. Reeves
*Assistant Examiner*—C. Barrett
*Attorney, Agent, or Firm*—Rogers & Scott

[57] ABSTRACT

The invention provides a control system for a vehicle fluid spring suspension system consisting of four fluid springs which support the vehicle body from two longitudinally-spaced trucks. Typically such a vehicle is a rail car employing air springs. The two air springs on each truck are disposed on opposite sides of the longitudinal center line of the vehicle, corresponding to its direction of travel. Three of the springs are provided with levelling valves which keep them at a constant height. A measuring device, either mechanical or electrical, measures the difference in internal spring pressure in the two springs on one truck that both have levelling valves; it also measures the difference in internal spring pressures in the two springs on the other truck and then adjusts the pressure in the spring without a levelling valve until the pressure difference is the same as for the two springs on the other truck. The arrangement avoids the establishment of unequal pressures diagonally of the vehicle that normally result from height adjustment errors in the levelling valve links and can seriously affect wheel loading and control of braking. The system is able to maintain control of short and long term roll movements.

11 Claims, 8 Drawing Figures

CONTROL SYSTEMS FOR VEHICLE FLUID SUSPENSION SYSTEMS

FIELD OF THE INVENTION

The present invention is concerned with improvements in or relating to control systems for vehicle fluid suspension systems, for a vehicle of the kind comprising a vehicle body mounted by four spaced fluid supports on two separate longitudinally-spaced vehicle trucks with two supports on each truck, the two supports on each truck being disposed on opposite sides of the longitudinal centre line of the vehicle. More specifically, the invention is concerned with vehicle air spring suspension systems for rail cars.

REVIEW OF THE PRIOR ART

A common form of suspension system for a vehicle, particularly a rail car vehicle of the kind specified above, consists of two longitudinally-spaced wheeled trucks on which the vehicle body is mounted, and includes two pairs of air springs, each pair being mounted on opposite ends of a pivoted bolster on the respective truck to support the vehicle body therefrom, the two springs of each pair thus being disposed on opposite sides of the vehicle longitudinal centre line. Such air springs usually are provided with respective "levelling" valves mounted in some way to the vehicle body and the truck so as to be in parallel with the air springs and operative to maintain the spring automatically at a specified height by supply of air to the spring, or exhaust of air therefrom, as may be required. Thus, as the spring compresses because of increased load, either static or dynamic, the levelling valve admits additional air thereto until it returns to its original height.

The most common of the problems encountered with such a system is the occurence of higher pressures than the usual mean values in two diagonally-disposed springs, accompanied by lower pressures than the mean values in the other two diagonally-disposed springs. A primary cause of such an unbalance is an error in the height adjustment of one or more of the levelling valves resulting in uneven pressures between the two springs of each pair. The air springs are working against relatively stiff primary springs supporting the running wheels and their axles to the truck, and also against a vehicle body that is torsionally very rigid, so that it is the air springs which "give" to accommodate the error. A torsional moment is therefore developed in the car body which acts in opposite directions on the two trucks, producing the unwanted unbalance. Other causes of the same undesirable effect are, for example, errors in the height adjustment of the primary springs; a body banking system that does not level correctly; wavy track, especially that encountered in many rail yards; and the presence of a "dead band" in the operating characteristic of the levelling valves, which cannot be eliminated or the valves will be over-sensitive and attempt to correct every small height variation.

These unbalanced spring pressures can seriously affect the loading of the vehicle running wheels with consequent problems of track and wheel wear, and are particularly troublesome in vehicles where the air spring pressure is used as an indication of the vehicle load for the control of acceleration and braking rates, since errors can result. Unbalanced vehicle body weight and unbalanced passenger load will also cause unbalanced spring pressures, but these must be accepted since the system cannot correct for such variations.

One system that has been proposed hitherto to avoid this difficulty is to connect together the interiors of the two springs on one truck, so that they will always equalize in pressure. This will eliminate the differences due to the above-described torsional moments in the stiff vehicle body, but also eliminates the resistance to long-term roll in the truck that has the inter-connected springs; the flow of air between them can be throttled to provide short term roll resistance (i.e. less than about 10 seconds) but of course cannot be stopped entirely. Therefore, with this system long term roll and unbalanced loads are only resisted by the springs on the other truck, resulting in an effective doubling of body roll angle and wheel unloading caused by roll, with consequent increased possibility of banging of the vehicle body against its roll end stops with accompanying objectionable increased passenger discomfort.

DEFINITION OF THE INVENTION

It is therefore the principal object of the present invention to provide a new control system for air spring suspension systems for vehicles of the kind specified.

In accordance with the present invention there is provided a control system for vehicle support systems for a vehicle of the kind comprising a vehicle body mounted by four spaced supports on two separate longitudinally-spaced vehicle trucks, with two supports on each truck, the two supports on each truck being disposed on opposite sides of the longitudinal centre line of the vehicle; the system comprising:

levelling valve means for a first, second and third of the supports, each adapted to supply fluid to and discharge fluid from its respective first, second and third support so as to maintain the support with a predetermined height between the respective portions of the truck and the vehicle body, fluid flow control means for the fourth support not having a levelling valve for supplying fluid to the said fourth support and for discharging fluid therefrom, pressure detecting means detecting the first and second fluid pressures in the first and second supports of the truck which both have respective levelling valves valve means and detecting the difference between the said first and second pressures, and detecting the third and fourth pressures in the third and fourth supports and detecting the difference between the said third and fourth pressures, and means controlling the said pressure fluid flow control means for the fourth support to adjust the fluid pressure in the fourth support until the difference between the said third and fourth pressures is equal to the difference between the said first and second pressures.

The said pressure detecting means and pressure fluid flow control means may comprise two opposed pistons mounted in respective cylinders for movement with one another and a valve operator member constituting the said valve operator means connected to the pistons, inlet means for feeding fluid under pressure from the first and third supports separately to one piston, and for feeding fluid under pressure from the second and fourth supports separately to the other piston, whereby an unbalance between the forces applied to the two pistons causes movement thereof and of the valve operator member to control the said valve means supplying fluid to and exhausting fluid from the fourth support to balance the said forces.

Alternatively, the said pressure detecting means and fluid flow control means may comprise electric internal fluid pressure detectors for each support producing respective electric signals representative of the said internal fluid pressures, two difference measuring circuits measuring the difference respectively between the signals from the first and second supports and the third and fourth supports and producing corresponding difference signals, and a comparator and controller circuit comparing the said difference signals and constituting the said means controlling the said pressure fluid flow control means for the fourth support to supply fluid thereto or exhaust fluid therefrom in accordance with the said comparison of the difference signals.

Preferably the said supports are air springs and the fluid fed thereto and exhausted therefrom is air.

DESCRIPTION OF THE DRAWINGS

Air spring control systems that are particular preferred embodiments of the invention will now be described, by way of example, with reference to the accompanying diagrammatic drawings, wherein.

DESCRIPTION OF THE PREFERRED EMBODIMENTS

Figure 1:
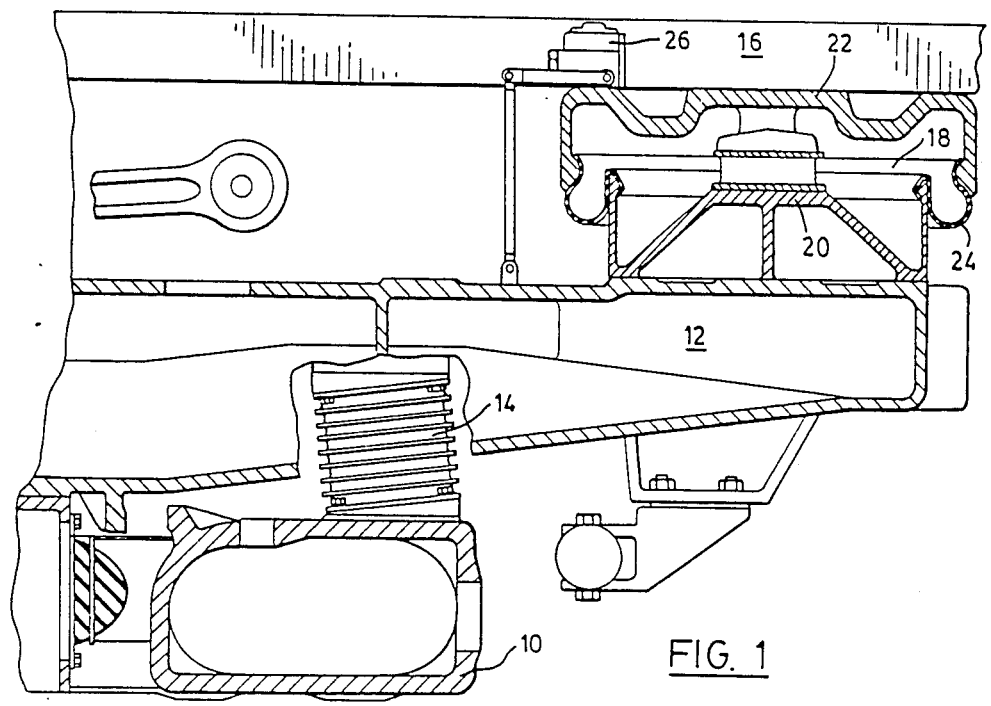
FIG. 1 is a transverse cross-section through part of a vehicle truck to show a typical construction and arrangement thereon of an air spring and an associated levelling valve.

FIG. 1 shows a portion only of a truck frame 10 mounted in any suitable manner to run on two longitudinally spaced wheel and axle sets (not shown). A transversely extending bolster 12 is mounted on the frame by two transversely spaced resilient devices 14 (only one shown) of well-known construction consisting of parallel layers of elastomeric material sandwiched between spaced parallel metal plates. The vehicle body 16 is represented herein by a portion of its floor and this is supported from the bolster by two spaced air springs 18 (only one shown in FIG. 1) mounted one at each end of the bolster. The air spring illustrated is of the diaphragm type and consists of two metal parts 20 and 22 connected together to form an air-enclosing chamber by a flexible annular diaphragm 24 which permits the necessary vertical movement between the two parts 20 and 22. If the spring is provided with a levelling valve 26 this is mounted in some convenient manner between the bolster 12 and the vehicle body 16, so that it is controlled in accordance with the height of the body 16 above the bolster to either supply air to the spring, and thus increase its height, or to allow air to escape from the spring, and thus decrease its height.

Figure 2:
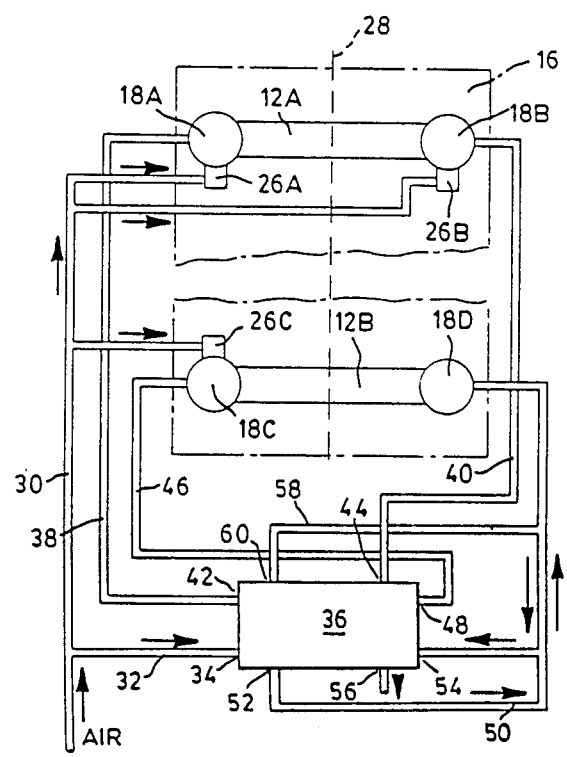
FIG. 2 is a schematic diagram of a mechanical control system of the invention.

Referring now to FIG. 2, a vehicle air spring suspension system consists of first and second air springs 18A and 18B respectively mounted on opposite ends of a bolster 12A, and third and fourth springs 18C and 18D respectively mounted on opposite ends of a bolster 12B. The longitudinal centre line of the vehicle, parallel to its direction of movement, is indicated by broken line 28. The three springs 18A, 18B and 18C are provided with respective levelling valves 26A, 26B and 26C and these are supplied with compressed air from a source (not shown) via supply pipe 30. Compressed air is also supplied via pipe 32 to the inlet port 34 of an air spring control valve assembly 36 shown in perspective in FIG. 3, and in cross-section in FIG. 4.

Both of the first and second air springs 18A and 18B have levelling valves and the air pressures within the springs are fed via respective pipes 38 and 40 to inlets 42 and 44 of assembly 36. The third spring 18C also has a levelling valve and the air pressure therein is fed via pipe 46 to inlet port 48. The fourth air spring 18D has no levelling valve and is fed with compressed air under control of the valve assembly 36 via pipe 50 from outlet port 52, or alternatively will deliver air to the valve assembly 36 through inlet 54 for exhaust to atmosphere via outlet 56. The air pressure within the spring 18D is fed to the assembly for control purposes via pipe 58 and inlet 60.

Figure 3:
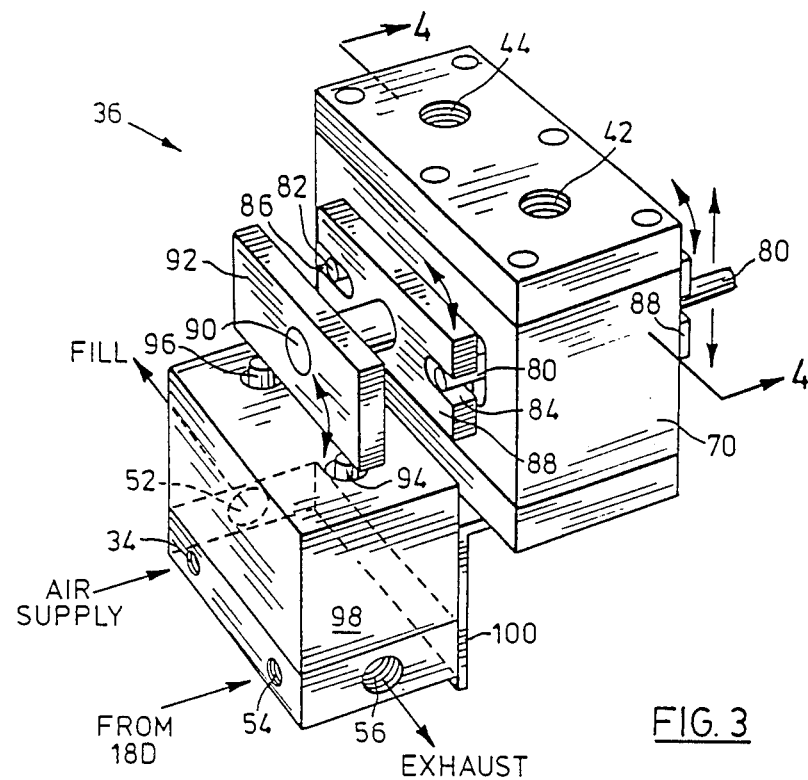
FIG. 3 is a perspective view of an air spring control valve assembly which is a first embodiment of the invention for use in the mechanical control system of FIG. 2.
Figure 4:
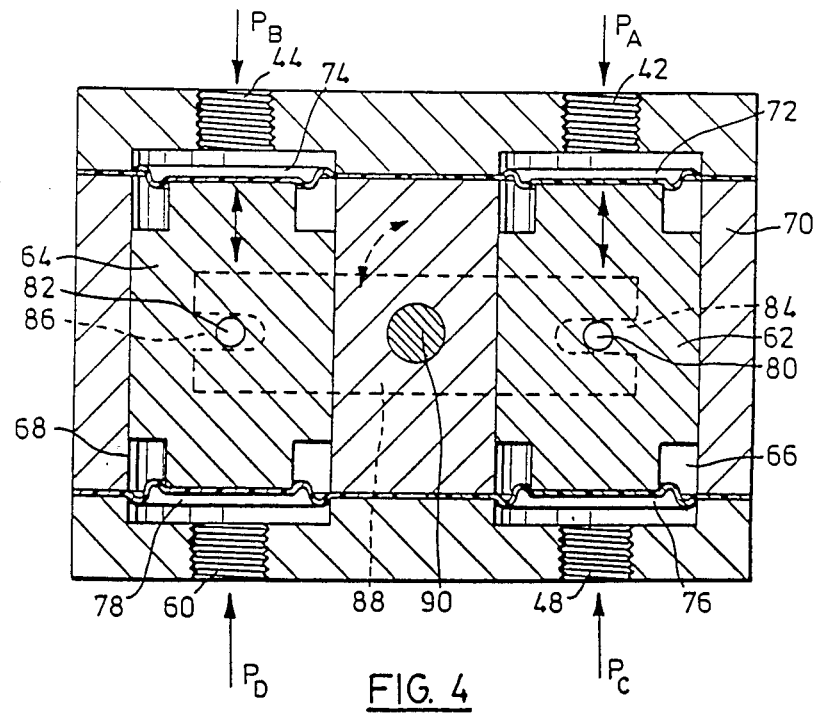
FIG. 4 is a cross-section of the valve assembly of FIG. 3 taken on the line 4—4 of FIG. 3.

Referring now to FIGS. 3 and 4, it will be seen that this assembly 36 consists of two similar "pistons" 62 and 64 mounted for respective parallel sliding movements in respective parallel cylinders 66 and 68 in a body 70, the two ends of each piston each being connected to the centre of a respective circular pleated "rolling" diaphragm 72, 74, 76 and 78. The diaphragms seal the ends of the cylinders while permitting the longitudinal movements of pistons under the action of the pressures applied to the external surfaces of the diaphragms. The two pistons are provided with respective pins 80 and 82 extending through the pistons and engaged at their ends in respective slots 84 and 86 in opposite ends of two tiltable levers 88 fastened to a rotatably-mounted support shaft 90 on opposite sides of the body 70. An extension of the shaft 90 carries an operating lever 92 the two ends of which can engage alternatively the operating plunger 94 of an exhaust valve, or the operating plunger 96 of a fill valve, these two valves being mounted in a valve body 98 fixed to a support 100 which also carries the assembly body 70.

The air supplied at pressure PA from spring 18A to inlet 42 is effective against the exterior circular face of diaphragm 72, while that supplied at pressure PC from spring 18C to inlet 48 is effective against the exterior circular face of diaphragm 76, the two diaphragm surfaces having the same cross-section area. Assuming that PA is greater than PC by $\Delta P$ the respective piston 62 will be urged by $\Delta P$ downward as seen in FIGS. 3 and 4 by a force corresponding to $\Delta P$, so that the levers 88 and 90 are urged to rotate clockwise for engagement of lever 90 with exhaust valve plunger 94. The air supplied at pressure PB from spring 18B to inlet 44 is effective against the circular end face of diaphragm 74, while the air supplied at pressure PD from spring 18D to inlet 60 is effective against the circular end face of diaphragm 78. If PB is greater than PD by the same amount $\Delta P$ then the same force urges the piston 64 downwards as seen in FIG. 4, urging the levers 88 and 90 to rotate anti-clockwise, so that the forces balance and the operator arm 92 remains central and does not operate either valve plunger 94 or 96. The two springs 18A and 18C on the same side of the longitudinal centre line 28 are therefor at a pressure greater by the same amount than their associated springs 18B and 18D on the other side of the centre line, and there is therefore no torque moment applied to the vehicle body between the two bolsters.

If now PA increases even more the piston 62 moves downward as seen in FIG. 4 so that operator 92 rotates clockwise and engages the exhaust valve operator 94 to exhaust air from spring 18D until the difference between 18C and 18D reaches the same higher value. If, on the other hand, PA decreases so that ΔP decreases the piston 62 moves upward to rotate operator 92 anticlockwise, whereupon operator 92 engages the fill valve operator 96 to supply air to the spring 18D and reduce the difference between PD and PC. A corresponding effect is obtained if PB increases or decreases, the value of PD again being changed to maintain the constant difference.

It will be seen that any roll moment supplied to the vehicle body will increase the spring pressures in the two springs on the same side, but will not upset the balance of the differences, and such a roll moment, whatever its term, is therefore resisted at both ends of the vehicle, and not only short term movements, as with the above described prior art system. In the simplest form, without the use of any special spring height controls, the static or mean roll position of the vehicle body is determined by the adjustment of the levelling valves at one end only, since one levelling valve is missing from the other truck. This is sufficient since the two trucks are parallel on average, as the vehicle moves along its usual path, except briefly at the entrance to and exit from relatively sharp curves. Although the fourth spring does not have a height control, since it has the same characteristics as the other three springs its height will be correct when it is carrying its correct share of the body weight, as measured by its internal air pressure.

The action of lateral forces, such as centrifugal force, will be to increase the spring pressures on one side of the vehicle and the system will adjust these pressures so that both trucks offer equal resistance to the resulting roll moment, without establishing a torque moment in the vehicle body. The springs on the same sides of the two trucks will therefore retain equal heights, and the same height difference from their associated springs on the same bolster. It will be seen that the system will also adjust to resist both lateral and longitudinal offsets of the centre of gravity of the vehicle body, the lateral offset being resisted equally on both trucks.

Errors in height adjustments of the vehicle body due to the levelling valves, the primary suspension height errors, and incorrectly centered banking systems will only affect the mean roll position of the vehicle body and the deviation from the optimum position will usually not be noticeable; the air spring internal pressures will not be affected. It will be understood that the static pressures in all four springs are unlikely ever to be equal, owing to inherent unbalances in body weight and any additional unbalances caused by the load, but differences of this kind are beyond control by the suspension system which will in any case cause a pressure distribution among the springs which is the optimum for the conditions that obtain.

Figure 5:
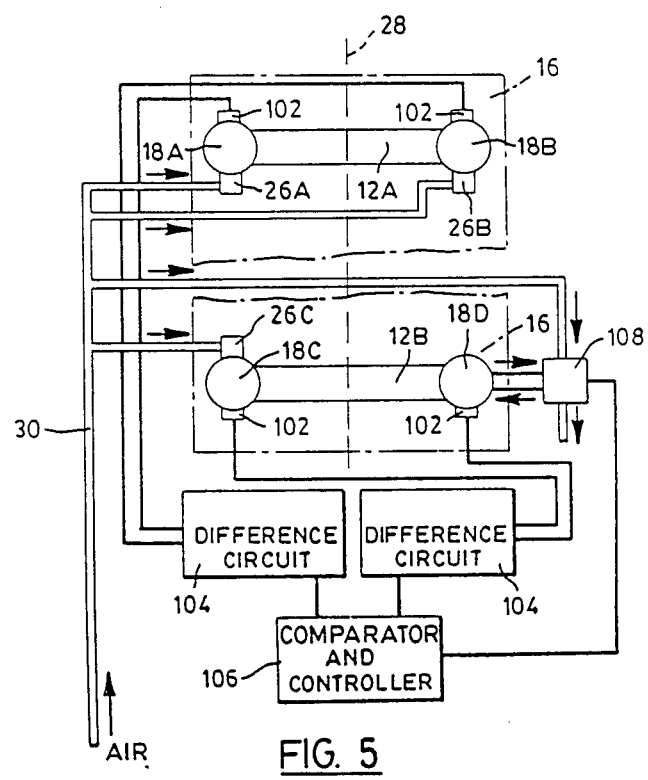
FIG. 5 is a schematic diagram of an electronic control system of the invention.

FIG. 5 shows schematically an electronic control system, the same parts illustrated therein as in FIG. 2 being given the same reference number. The four air springs are provided with respective electric internal air pressure detectors 102A, 102B, 102C and 102D which provide electric signals corresponding to the air pressure values. The signals from 102A and 102B are fed to a difference measuring circuit 104A, while the signals from 102C and 102D are fed to a similar circuit 104B. The outputs of the two circuits 104A and 104B are compared in comparator and controller circuit 106 which then controls valve 108 to either feed air into air spring 18D, or exhaust air therefrom, as required.

It will be seen that theoretically the systems may be regarded as functioning to make the relation (PA−PB)−(PC−PD) equal to zero, but in practice, in all embodiments, particularly those employing mechanical devices, it will usually be necessary for the resultant force equivalent to (PA−PB)−(PC−PD) to not equal zero, but instead to exceed a certain threshold value before any fluid is added to or released from the fourth spring. The threshold in the mechanical devices will arise because of friction at various points and because of the force required to operate the controlling valves. These forces are unavoidable and are also desirable, since they prevent the frequent operation and pressure adjustments that would otherwise occur with every small change in the force resultant. In the electrical alternative the electrical equivalent of such mechanical friction or resistance may be incorporated in the control circuit to obtain the same desirable result. In both the mechanical and electrical devices a suitable threshold force can be achieved by selecting the correct materials and sizes for those components that affect it.

Figure 6:
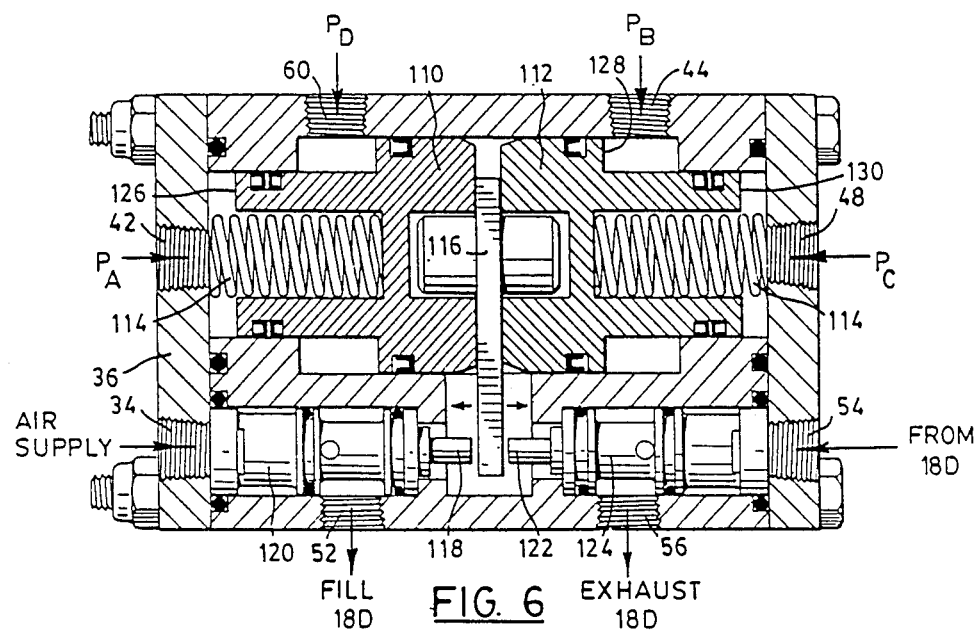
FIG. 6 is a cross-section through another air spring control valve which is a second embodiment of the invention.

FIG. 6 shows an alternative structure for the assembly 36, in which two similar T-cross-section pistons 110 and 112 are mounted with the feet of the T's facing one another for movement along coaxial axes and are urged toward one another by respective compression springs 114, so that they sandwich between them an operating arm 116 that will move the pistons to engage either the operating stem 118 of a fill valve 120, or the operating stem 122 of an exhaust valve 124.

The air supplied at pressure PA from spring 18A to inlet 42 is effective against the circular face 126 of piston 110, while that supplied at pressure PB from spring 18B to inlet 44 is effective against the annular face 128 of piston 112. The circular piston face 126 has the same cross-section area as the annular piston face 128 and, assuming that PA is greater than PB by ΔP the two pistons will be urged by ΔP to the right as seen in FIG. 6 by a force corresponding to ΔP. The air supplied at pressure PC from spring 18C to inlet 48 is effective against the circular end face 130 of piston 112, while the air supplied at pressure PD from spring 18D to inlet 60 is effective against the annular face of piston 62. If PC is greater than PD by the same amount ΔP then the same force urges the two pistons to the left as seen in FIG. 6, so that the forces balance and the operator arm 116 remains central and does not operate either fill valve 120 or exhaust valve 124. The two springs 18A and 18C on the same side of the longitudinal centre line 28 are therefore at a pressure greater by the same amount than their associated springs 18B and 18D on the other side of the centre line, as with the embodiment of FIG. 3.

If now PA increases even more the pistons move to the right as seen in FIG. 6 so that operator 116 engages the exhaust valve operator 122 to exhaust air from spring 18D until the difference between 18C and 18D reaches the same higher value. If PA decreases so that ΔP decreases the pistons move to the left and operator 116 engages the fill valve operator 118 to supply air to the spring 18D and reduce the difference between PD and PC. A corresponding effect is obtained if PB increases or decreases, the value of PD again being changed to maintain the constant difference.

Figure 7:
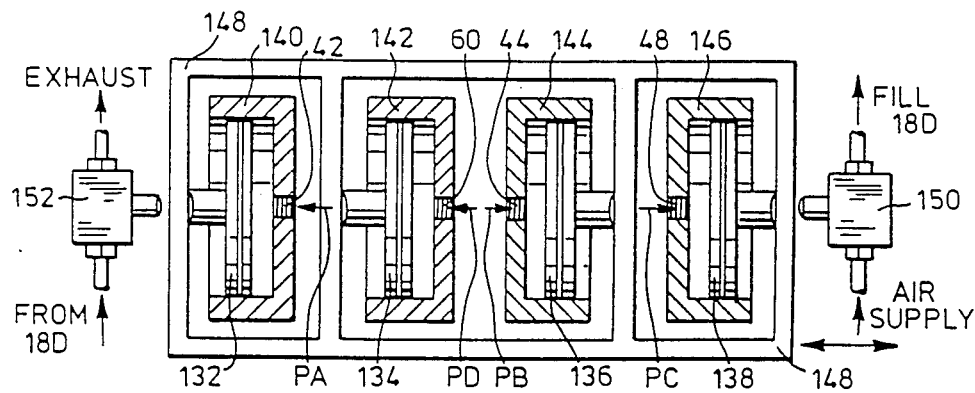
FIGS. 7 and 8 are respectively plane cross-sections through other air spring control valves which are third and fourth embodiments of the invention.

Another embodiment illustrated by FIG. 7 consists of four separate pistons 132, 134, 136 and 138 of equal area arranged along a common axis and operative in respective cylinders 140, 142, 144 and 146 with pressures from the four springs acting on the respective pistons which in turn apply their force to a common linearly movable connecting yoke 148. The fluid pressures from the first and second springs are applied to opposed pistons 132 and 136, while those from the third and fourth springs are applied to opposed pistons 134 and 138. The directions of operation of the respective pistons are such that the resultant force acting on the yoke is equivalent to (PA−PB)−(PC−PD). If that resultant force is not zero and above the desired threshold value, as described above, the yoke moves linearly to the right or left as seen in the Figure to act on the pressure controlling valves 150 and 152 so as to alter PD upward or downward as required to reduce the resultant force toward zero.

Figure 8:
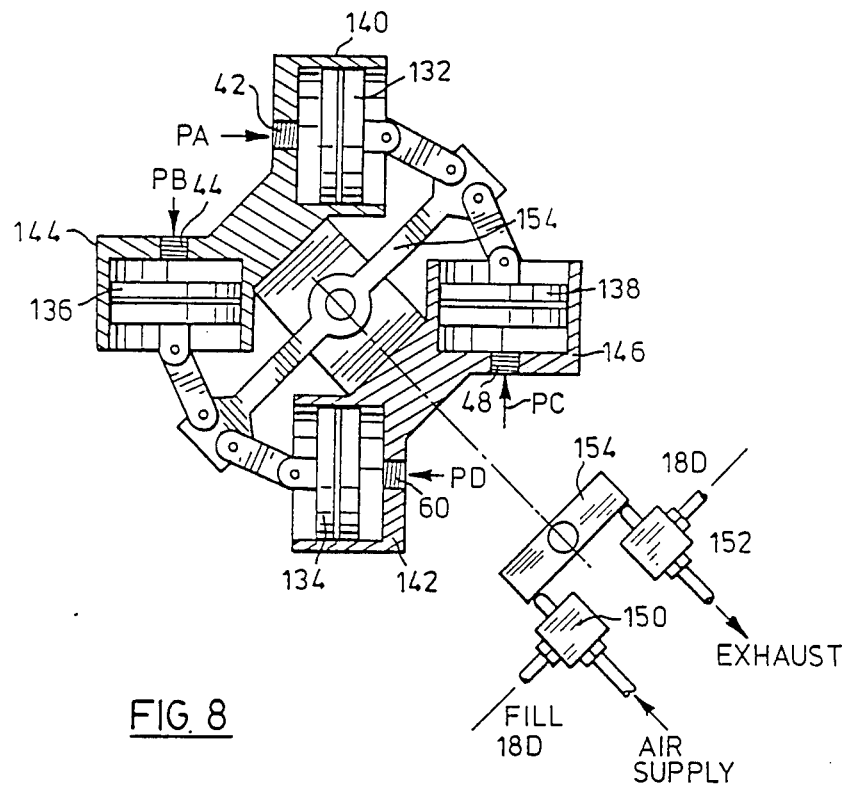

In a further embodiment illustrated by FIG. 8 the separate pistons 132-138 are arranged to move along four separate axes and apply their respective forces via pivotally connected links to a suitable pivoted yoke 154, which in turn operates the pressure control valves 150 and 152 alternatively by means of connected pivoted lever 154, as with the embodiment of FIG. 3, to produce the desired balance of pressures.

It will be understood by those skilled in the art that each vehicle truck can be of the type having a single axle, or two or more longitudinally-spaced axles. Moreover, it will also be understood that although the system specifically described has four air springs as the vehicle supports, supports employing other fluids may be employed, for example liquid fluids which do not intrinsically provide any spring action. In the system described each support means is illustrated as being constituted by a single spring, but it will be understood that each support may be constituted by a plurality of springs or their equivalent.

We claim:

1. A control system for vehicle support systems for a vehicle of the kind comprising a vehicle body mounted by four spaced supports on two separate longitudinally-spaced vehicle trucks, with two supports on each truck, the two supports on each truck being disposed on opposite sides of the longitudinal centre line of the vehicle; the system comprising:

levelling valve means for a first, second and third of the supports, each adapted to supply fluid to and discharge fluid from its respective first, second and third support so as to maintain the support with a predetermined height between the respective portions of the truck and the vehicle body, fluid flow control means for the fourth support not having a levelling valve for supplying fluid to the said fourth support and for discharging fluid therefrom, pressure detecting means detecting the first and second fluid pressures in the first and second supports of the truck which both have respective levelling valve means and detecting the difference between the said first and second pressures, and detecting the third and fourth pressures in the third and fourth supports and detecting the difference between the said third and fourth pressures, and means controlling the said fluid flow control means for the fourth support to adjust the fluid pressure in the fourth support until the difference between the said third and fourth pressures is equal to the difference between the said first and second pressures.

2. A system as claimed in claim 1, wherein said pressure detecting means and fluid flow control means comprises:

a first movable member connected to a first and a second diaphragm for movement in one direction upon supply of fluid under pressure to the first diaphragm and for movement in th opposite direction upon supply of fluid under pressure to the second diaphragm;

a second movable member connected to a third and a fourth diaphragm for movement in one direction upon supply of fluid under pressure to the third diaphragm and for movement in the opposite direction upon supply of fluid under pressure to the fourth diaphragm;

means for feeding fluid under pressure from the said first and seoond supports respectively to the first and second diaphragms;

means for feeding fluid under pressure from the said third and fourth supports respectively to the third and fourth diaphragms; and valve operator means connected to the said first and second movable members and movable thereby, whereby an unbalance between the forces applied to the two movable members causes movement thereof and of the valve operator means to control valve means supplying fluid to and exhausting fluid from the fourth support to balance the said forces.

3. A system as claimed in claim 2, wherein the said first and second movable members comprise respective pistons mounted for longitudinal movement in respective cylinders with the respective diaphragms connected to the opposite ends of the movable member.

4. A system as claimed in any one of claims 1 to 3, wherein the said supports are air springs and the fluid fed thereto and exhausted therefrom is air.

5. A system as claimed in claim 1, wherein said pressure detecting means and fluid flow control means comprises two opposed pistons mounted in respective cylinders for movement with one another and a valve operator member constituting said valve operator means connected to the said pistons, inlet means for feeding fluid under pressure from the first and third supports separately to one pistion, and for feeding fluid under pressure from the second and fourth supports separately to the other piston, whereby an unbalance between the forces applied to the two pistons causes movement thereof and of the valve operator member to control the said valve means supplying fluid to and exhausting fluid from the fourth support.

6. A system as claimed in claim 1, wherein said pressure detecting means and fluid flow control means comprise electric internal fluid pressure detectors for each support producing respective electric signals representative of the said internal fluid pressures, two difference measuring circuits measuring the difference respectively between the signals from the first and second supports and the third and fourth supports and producing corresponding difference signals, and a comparator and controller circuit comparing the said difference signals and constituting the said means controlling the said fluid flow control means for the fourth support to supply fluid thereto or exhaust fluid therefrom in accordance with the said comparison of the difference signals.

7. A system as claimed in claim 1, wherein said pressure detecting means and control means comprises four pistons mounted in respective cylinders, and a yoke member connecting the four pistons for movement with one another and carrying a valve operator member constituting the said means controlling the fluid flow control means, valve means constituting the said fluid flow control means having the operator member connected thereto, inlet means for feeding fluid under pressure from the first and second supports separately to respective first and second pistons of the four pistons movable in opposition to one another, and for feeding fluid under pressure from the third and fourth supports separately to respective third and fourth pistons of the four pistons movable in opposition to one another, whereby an unbalance between the forces applied to the yoke member causes movement thereof and of the valve operator member to control the said valve means.

8. A system as claimed in any one of claims 5 to 7, wherein the said supports are air springs and the fluid fed thereto and exhausted therefrom is air.

9. A system as claimed in claim 7, wherein the said yoke member is mounted for linear movement upon corresponding movement of the pistons.

10. A system as claimed in claim 7, wherein the said yoke member is mounted for rotational movement upon corresponding linear movement of the pistons.

11. A system as claimed in claim 9 or 10, wherein the said supports are air springs and the fluid fed thereto and exhausted therefrom is air.

* * * * *